(12) United States Patent
Kanda (10) Patent No.: US 6,879,463 B2
(45) Date of Patent: Apr. 12, 2005

(54) HEAD SLIDER AND DISK DRIVE UNIT EMPLOYING THE SAME

(75) Inventor: Koki Kanda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/805,960

(22) Filed: Mar. 14, 2001

(65) Prior Publication Data

US 2002/0015262 A1 Feb. 7, 2002

(30) Foreign Application Priority Data

Jul. 31, 2000 (JP) ........................................ 2000-232117

(51) Int. Cl.[7] ............................................. G11B 21/21
(52) U.S. Cl. .................................................. 360/235.8
(58) Field of Search ........................ 360/235.4, 235.8, 360/236.1, 236.2, 236.3, 236, 230, 234.3, 235.5, 235.6, 235.7, 236.4, 236.5

(56) References Cited

U.S. PATENT DOCUMENTS

| | | | | |
|---|---|---|---|---|
| 6,137,656 A | * | 10/2000 | Levi et al. ............... | 360/235.4 |
| 6,144,528 A | * | 11/2000 | Anaya-Dufresne et al. ....................... | 360/235.4 |
| 6,349,018 B2 | * | 2/2002 | Koishi et al. ............ | 360/236.3 |
| 6,351,345 B1 | * | 2/2002 | Kameyama .............. | 360/236.3 |
| 6,377,422 B1 | * | 4/2002 | Boutaghou et al. ......... | 360/230 |
| 6,433,965 B1 | * | 8/2002 | Gopinathan et al. ..... | 360/235.4 |
| 6,462,909 B1 | * | 10/2002 | Boutaghou et al. ...... | 360/235.8 |
| 2002/0075601 A1 | * | 6/2002 | Koishi ..................... | 360/236.2 |

FOREIGN PATENT DOCUMENTS

JP        2001-6308      1/2001

* cited by examiner

Primary Examiner—A. J. Heinz
Assistant Examiner—Mark Blouin
(74) Attorney, Agent, or Firm—Greer, Burns & Crain, Ltd.

(57) ABSTRACT

There is provided a head slider for reducing a sticking force or stiction between the head slider and a disk in a disk drive unit in which a difference in level between an air bearing and a head portion is small when the disk rotates in a reverse direction. Air bearing portions having flat top surfaces are formed in parallel with each other on both sides of a side of a slider which flies above the disk at an air outflow end of the slider. A head portion comprising head elements and a protection film for protecting the head elements is provided at an air outflow end of one of the air bearing portions, while a dummy head portion comprising only a protection film is provided at an air outflow end of the other air bearing portion. Top surfaces of the head portion and the dummy head portion are formed lower by a step than top surfaces of the air bearing portions. The top surfaces of the head portion and the dummy head portion on the air outflow ends are formed lower than the top surfaces thereof adjacent to the air bearing portions, whereby the contact resistance between the head slider and the disk resulting when the disk rotates in the reverse direction is reduced.

13 Claims, 12 Drawing Sheets

HEAD SLIDER AND DISK DRIVE UNIT EMPLOYING THE SAME

BACKGROUND OF THE INVENTION

1. Field of the Invention

The present invention relates to a head slider and a disc drive unit employing the same head slider, and more particularly to a head slider which can reduce a sticking force or a stiction produced between the head slider and a recording medium, when they are brought into contact with each other when a disk drive unit starts up or stops, and to a disk drive unit employing the same head slider.

2. Description of the Related Art

In recent years, as magnetic disk drive units have been made smaller in size while their capacities have been increased, various innovative technologies have been introduced in order to provide faster and more reliable disk drive units. Similar innovations in technology have been demanded for disk media which carry out writing and reading of data.

However, as the magnetic disk drives have been made smaller in size and their capacities have been increased, flying heights of heads have decreased, and as the flying heights have decreased, the surfaces of the disk media have been made smoother. The head is mounted on a distal end portion of a head slider and is allowed to fly above a disk medium by the slider with an extremely small gap relative to the disk medium while a magnetic disk drive unit is in operation for writing and reading data into and from the disk medium.

On the other hand, when the power supply of the magnetic disk drive unit is switched off, the rotational speed of the disk medium decreases, whereby the head slider and the disk medium come into contact with each other and, eventually, the head slider comes to rest on the disk medium which then stops rotating. In the event that head slider stops on the disk medium having a smooth surface, a case where the head slider and the disk medium come to stick to each other may occur. In order to prevent this, a plurality of short legs, which are referred to as pads and have small contact areas, are provided on a conventional head slider on a side thereof facing the disk medium in such a manner as to protrude therefrom, whereby the head slider is constructed to rest on the disk medium on the legs.

On the contrary, when the power supply is switched on for the magnetic disk drive unit, a spindle motor for rotating the disk medium repeatedly rotates forward and backward to determine its rotating direction. In the worst case, there is a probability that the spindle motor rotates backward, and when this actually happens, the posture of the head at rest is such that the head is no longer supported by the legs as described previously but is instead supported at an end portion of the flying surface of the head slider.

In the event that the head slider is supported relative to the disk medium at the end portion of the flying surface thereof, the contact area between the head slider and the disk medium increases, and the sticking force or stiction of the head slider to the disk medium also increases, this deforming the head, whereby in the worst case there occurs a probability that a head crash may be caused. Countermeasures for this have been desired.

Additionally, in recent years, due to provision of high-density disk drive units, in an improved head slider in which the difference in level between an air bearing of the head slider and a head portion is reduced, the distance between the head portion and a disk medium has been gradually decreased. Due to this, in an improved head slider, when there occurs a reverse rotation of the disk medium, which modifies the posture of the head slider at rest, there is caused a problem that the head portion first comes into contact with the disk medium before an end face of the air bearing of the head slider comes into contact with the disk medium or both the end face of the air bearing of the head slider and the head portion come into contact with the disk medium. Then, in the event that both the end face of the air bearing of the head slider and the head portion come into contact with the disk medium when the disk medium rotates backwards, there is caused a problem that the contact area between the head slider and the disk medium increases, whereby the stiction therebetween increases.

SUMMARY OF THE INVENTION

To cope with this, an object of the present invention is to provide a head slider which can eliminate a risk that the contact area between a head slider and disk medium increases when the disk medium rotates backwards to thereby increase a sticking force or stiction therebetween even when the head slider is used as an improved head slider in which the difference in level between an air bearing portion of the head slider and a head portion of a head unit is reduced due to provision of high-density disk drive units, and a disk drive unit employing the same head slider.

With a view to attaining this object, according to the present invention, there is provided a head slider, for use in a disk drive unit, wherein flat air bearing portions are formed in parallel on both sides of a side of the head slider which flies above a disk medium at an air outflow end thereof in such a manner that the flat air bearing portions are raised higher by a step than a slider main body, and wherein a head portion comprising head elements and a protection film for protecting the head elements is provided adjacent to an air outflow end of one of the air bearings, whereas a dummy head portion comprising only a protection film is provided adjacent to an air outflow end of the other air bearing portion, top surfaces of the protection films being formed lower by a step than top surfaces of the air bearing portions, the head slider being characterized in that the top surfaces of the head portion and said dummy head portion on air outflow sides thereof are formed lower by a degree which is greater than a difference in level between the air bearing portions and said protection films.

In this case, the following aspects can be adopted.

(1) An aspect wherein the distance in a longitudinal direction of the head slider of an area where the top surface of the protection film on the head portion is formed lower is made equal to the distance in the longitudinal direction of the head slider of an area where the top surface of the protection film on the dummy head portion is formed lower.

(2) A head slider as set forth in the aspect (1), wherein the distance in the longitudinal direction of the head slider of an area where the top surface of the protection film on the dummy head portion is formed lower is made longer than the distance in a longitudinal direction of the head slider of an area where the top surface of the protection film on the head portion is formed lower.

(3) A head slider as set forth in the aspect (2), wherein the top surface of the protection film on the dummy head portion is formed such that a certain area of the top surface of the protection film is maintained as high as the height of the top surface of the protection film which is adjacent to the air bearing portion in the longitudinal direction of the head slider, whereas the remaining area of the top surface of the protection film is lowered than the certain area over an area to the vicinity of the air bearing portion.

(4) A head slider as set forth in the main aspect and any of the aspects from (1) to (3) above, wherein the top surfaces of the head portion and the dummy head portion on air outflow sides thereof are lowered by deleting the protection films partially.

(5) A head slider as set forth in the main aspect and any of the aspects from (1) to (4) above, wherein locations of the top surfaces of the head portion and the dummy head portion which are formed lower are level with the flying height of a side of a main body of the head slider which flies above the disk medium.

(6) A head slider as set forth in the main aspect and any of the aspects from (1) to (4) above, wherein the locations of the top surfaces of the head portion and the dummy head portion which are formed lower are positioned higher than the flying height of the side of the main body of the head slider which flies above the disk medium.

(7) A head slider as set forth in the main aspect and any of the aspects from (1) to (6) above, wherein a plurality of pads are provided on the side of the main body of the head slider which flies above the disk medium for avoiding the sticking of the head slider to the disk medium when the disk medium is at a stop.

(8) A magnetic disk drive unit employing a head slider as set forth in the main aspect and any of the aspects from (1) to (7) above.

According to the head slider according to the present invention and the disk drive unit employing the same head slider, with the improved head slider proposed to provide a disk drive unit having a higher density in which the difference in level between the air bearing on the head slider and the head portion on the head unit is reduced, a risk that the contact area between the head slider and the disk medium increases when the disk medium rotates in a reverse direction, to thereby increase a sticking force or stiction therebetween, is eliminated.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before describing the preferred embodiments, an explanation will be given of a conventional head slider and a disk drive unit employing the same head slider shown in FIGS. 1 to 4D.

Figure 1:
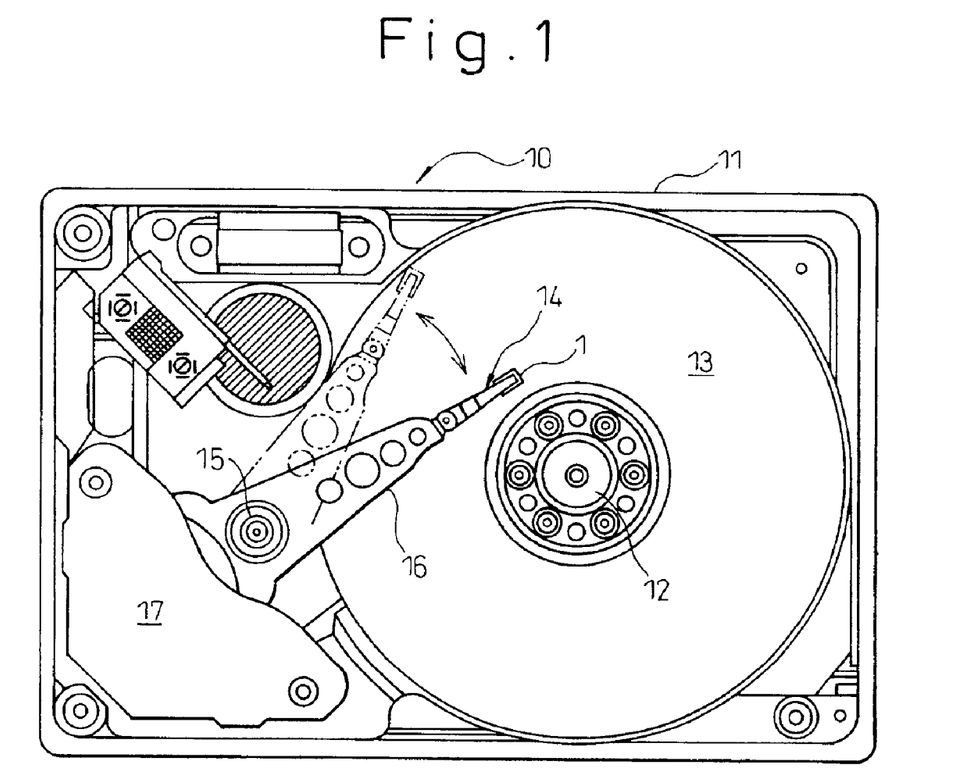
FIG. 1 is a plan view showing the general construction of a disk drive unit.

FIG. 1 shows the general construction of a magnetic disk drive unit 10. A spindle motor 12 is provided in a box body 11 of the magnetic disk drive unit 10, and at least one magnetic disk medium 13 is mounted on the spindle motor 12. The magnetic disk medium 13 is intended to record thereon data, and a head mounted on a head slider 1 carries out reading data recorded on the disk medium 13 or writing data to the disk medium 13. The number of head sliders 1 corresponds to the number of disk media 13.

The head slider 1 is supported by a head suspension 14 and is constructed to move in radial directions shown in arrows over the disk medium 13. When the head on the head slider 1 operates to perform reading data from the disk medium 13 or writing data to the head medium 13, the reading or writing operation is performed with the head slider 1 flying above the disk medium 13. The head suspension 14 is mounted on a carriage 16 which can swing around a rotating shaft 15. A coil is provided on a side of the carriage 16 which is opposite to a side where the head suspension 14 is mounted, and this coil is constructed to be driven by a voice coil motor 17.

Figure 2A:
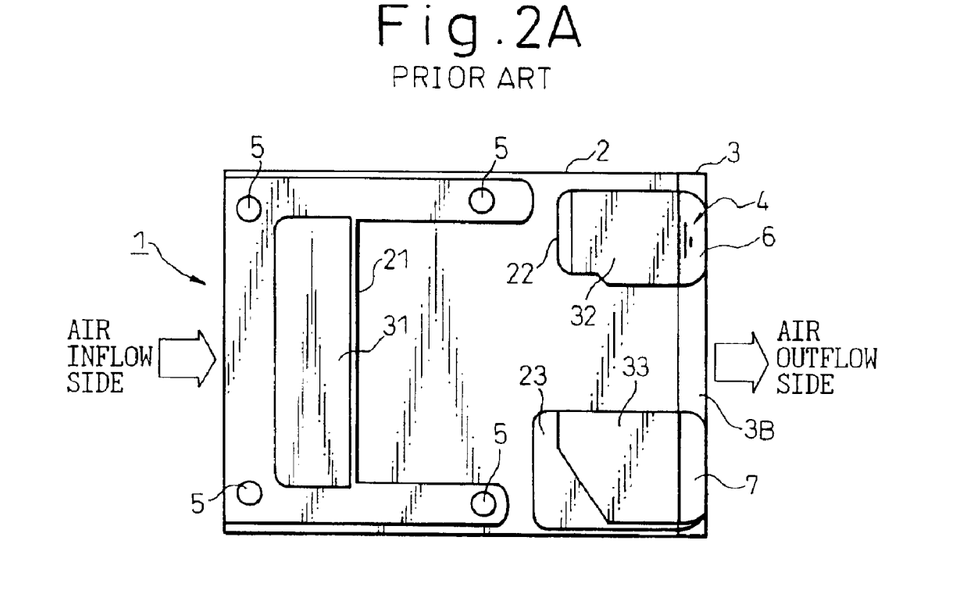
FIG. 2A is a bottom view of a conventional head slider for use in the disk drive unit.
Figure 2B:
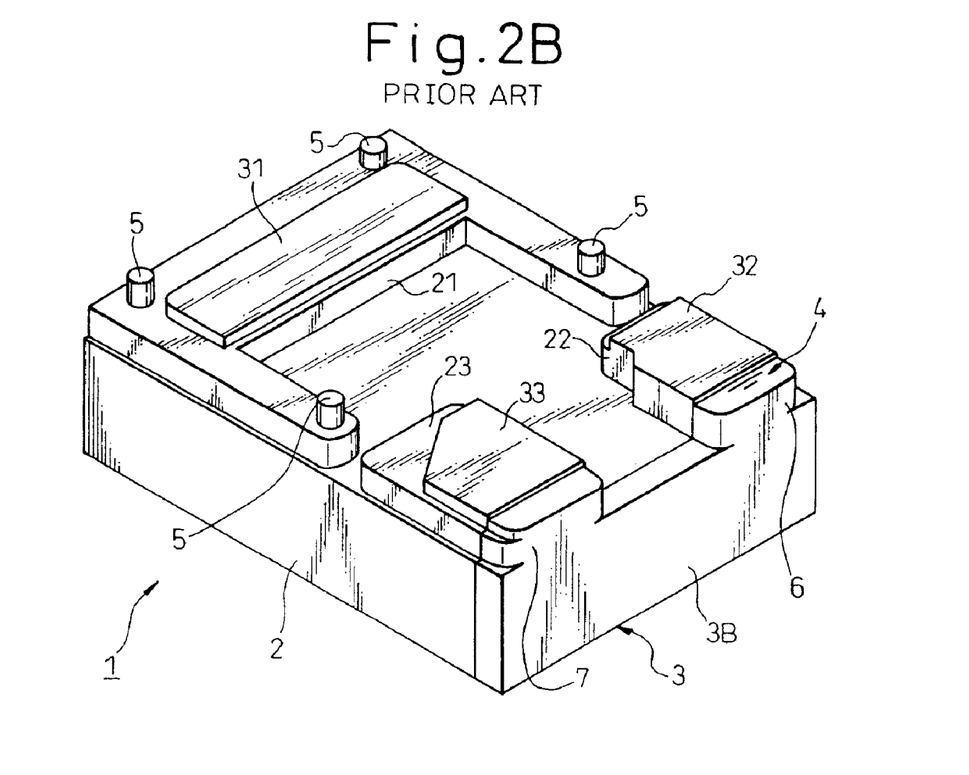
FIG. 2B is a perspective view of the head slider shown in FIG. 2A as viewed from a head side.

FIGS. 2A and 2B show the construction of a conventional head slider 1 for use in a magnetic disk drive unit 10 as described in FIG. 1. The head slider 1 consists of a slider base 2 and a head unit 3. The slider base 2 is formed from ferrite. Additionally, in this embodiment, a head 4 provided on the head unit 3 is a composite head comprising a GMR head and an inductive head.

A first U-shaped land portion 21 is provided at an air inflow end on a surface of the slider base 2 which flies above the disk medium where air flows in when the disk medium rotates, and second and third land portions 22, 23 are provided at an air outflow end of the flying surface. Top surfaces of the first to third land portions 21 to 23 are at the same height. In addition, a first air bearing portion 31 is provided on the top surface of the first land portion 21, a second air bearing portion 32 is provided on the top surface of the second land portion 22, and a third air bearing portion 33 is provided on the top surface of the third land portion 23. Top surfaces of the first to third air bearings 31 to 33 are flat and are all at the same height above the slider base 2. Furthermore, Pads 5 are provided at the four corners of the first land portion 21 in such a manner as to protrude therefrom. These four pads 5 are intended to reduce a static friction force between the head slider 1 and a disk medium resulting when the head slider 1 rests on a disk medium which is stopped. Therefore, the four pads 5 all have the same height.

The head unit 3 consists of a base portion 3B which is superimposed on the slider base 2, a head portion 6 most portions of which are superimposed on the second air bearing portion 32 of the second land portion 22 and a dummy head portion 7 most portions of which are superimposed on the third air bearing portion 33 of the third land portion 23. Top surfaces of the head portion 6 and the dummy head portion 7 are flat and are lower, by a step, than top surfaces of the second air bearing portion 32 and the third air bearing portion 33.

Figure 3A:
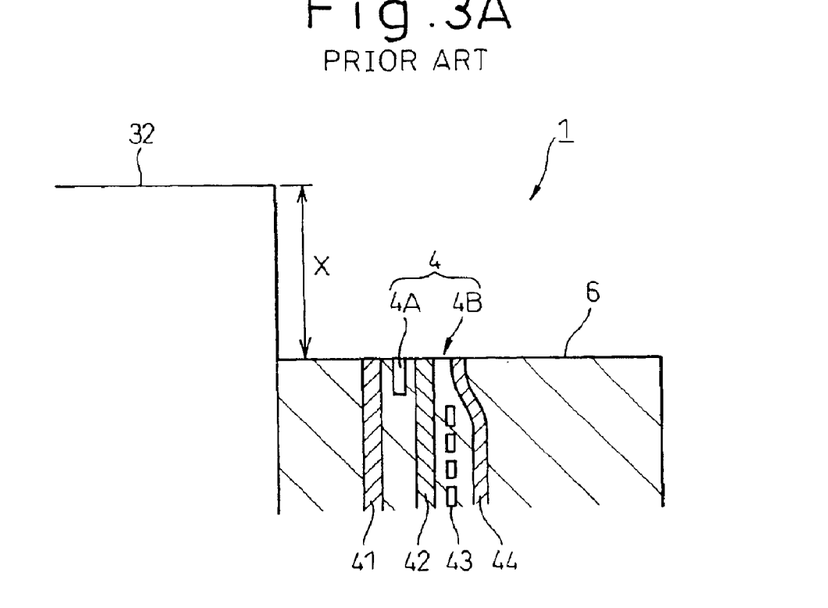
FIG. 3A is a partially enlarged view of a joint portion between a land portion of the conventional head slider and a head portion.

FIG. 3A shows an enlarged sectional view of a joint portion between the head portion 6 and the second air bearing portion 32. A difference X in level between the head portion 6 and the second air bearing 32 is about 5 nm in the conventional disc drive unit. The composite head 4 is incorporated in the head portion 6, and in this embodiment, the composite head 4 comprises a GMR head 4A as a read element and an inductive head 4B as a wright element. In FIG. 3A, reference numeral 41 denotes a lower shield film (a magnetic film), reference numeral 42 a lower magnetic film of the inductive head 4B, reference numeral 43 a coil conductor (a film-like coil), and reference numeral 44 an upper magnetic film of the inductive 4B. The composite head 4 is formed in an alumina protection film.

Figure 4A:
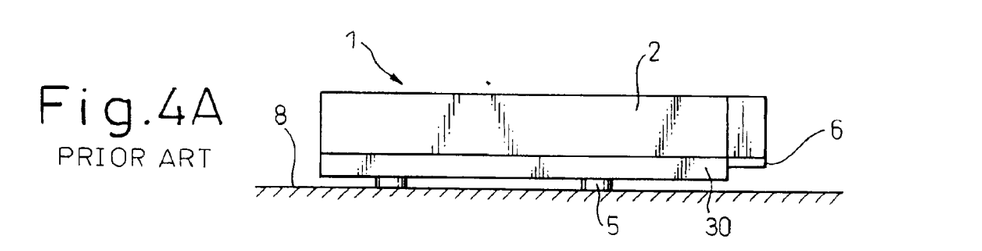
FIG. 4A is an explanatory view showing a normal posture of the conventional head slider when the conventional slider rests on a disk medium which is in a stationary state.

FIG. 4A shows a normal posture of the conventional head slider 1 when the conventional slider 1 rests on a disk unit 8 which is at a stop. The land portions and the air bearing portions are shown schematically as an integrated body. In this state, since the head slider 1 is in contact with the disk medium 8 at the four pads 5 provided on the land portion in such a manner as to protrude therefrom, the friction force between the head slider 1 and the disk medium 8 is low. In addition, the head portion 6 where the heads are provided is located at a position which is away from the surface of the disk medium 8.

Figure 4B:
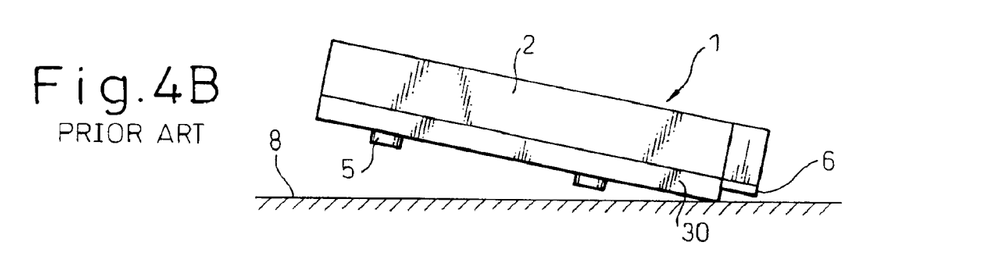
FIG. 4B is an explanatory view showing a posture of the conventional head slider at rest after the disk medium has rotated backwards.

FIG. 4B shows a posture of the conventional head slider 1 at rest after the disk medium 8 has rotated in a reverse direction. The top surface of the head slider 1 in the conventional disk drive unit at the air outflow end where air flows out when the head slider 1 flies is the top surface of the head portion 6 constituted by the alumina protection film. In addition, in the conventional disk drive unit, there is provided a difference in level between the air bearing 30 on the slider base 2 and the protection film (the alumina protection film) of the head portion 6 (the portion designated by the reference character X in FIG. 3A), and even when the disk medium 8 rotates in the reverse direction, the top surface of the air bearing 30 of the head slider 1 only contacts the disk medium 8. Additionally, in order to suppress the reverse rotation of the disk medium 8, the medium roughness of the surface of the disk medium and the film thickness of a lubricating layer are optimized to avoid contact with the disk medium.

Figure 4C:
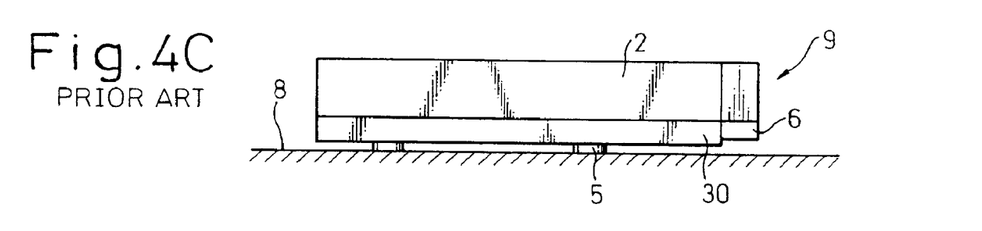
FIG. 4C is an explanatory view showing a normal posture of a conventional improved head slider when the conventional improved head slider rests on a disk medium which is in a stationary state.
Figure 4D:
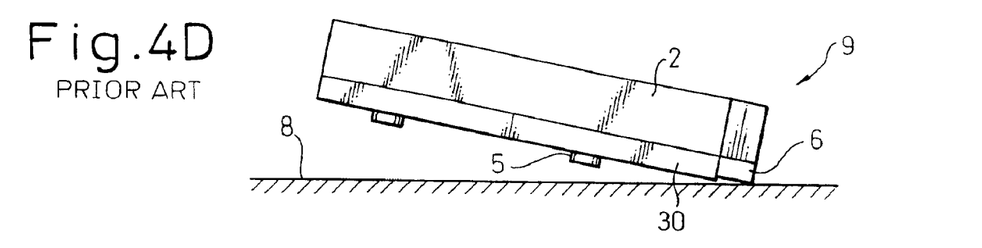
FIG. 4D is an explanatory view showing a posture of the conventional improved head slider at rest after the disk medium has rotated backwards.

In recent years, however, in order to provide disk drive units having a higher density, there has been proposed an improved head slider 9 in which the difference in level between the air bearing 30 on the head slider 1 and the head portion 6 is reduced as shown in FIG. 4C. In this improved head slider 9, the distance between the head portion 6 and the disk medium 8 is designed to decrease gradually.

In the improved head slider 9 as described above, however, as shown in FIG. 4D, in the event that there occurs a reverse rotation of the disk medium 8, changing the posture of the head slider 9, there is caused a problem that the head portion 6 first comes into contact with the disk medium 8 before the top surface of the air bearing 30 of the head slider 9 comes into contact with the disk medium 8, or that both the top surface of the air bearing 30 of the head slider 9 and the head portion 6 come into contact with the disk medium 8. Then, in the event that both the top surface of the air bearing 30 of the head slider 9 and the head portion 6 come into contact with the disk medium 8 when the disk medium 8 rotates in the reverse direction, there is caused a problem that the contact area between the top surface of the air bearing 30 and the disk medium 8 increases, this in turn increasing the stiction between the head slider 9 and the disk medium 8.

A mode for carrying out the present invention for solving those problems will be described in detail below based on embodiments thereof.

Figure 5A:
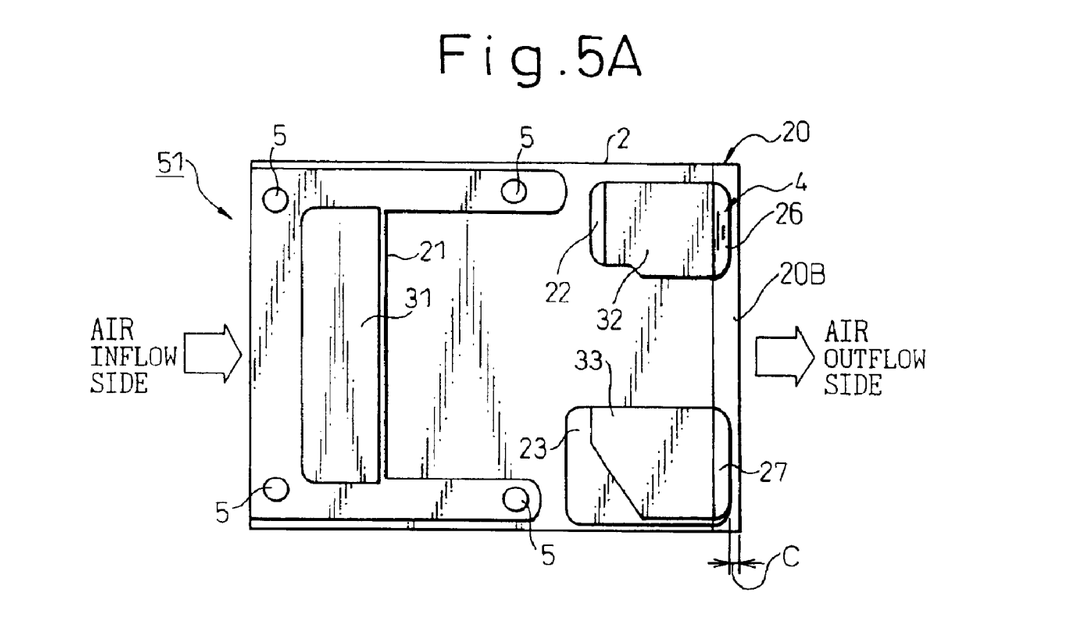
FIG. 5A is a bottom view of a head slider for use in a disk drive unit according to a first embodiment of the present invention.
Figure 5B:
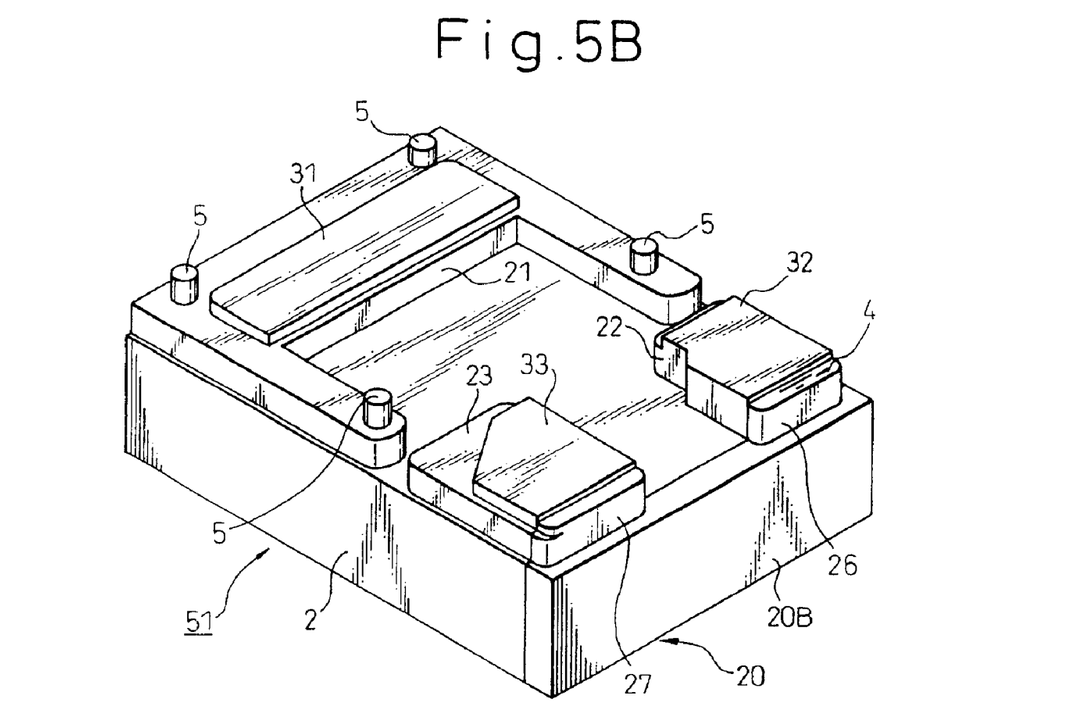
FIG. 5B is a perspective view as viewed from a head side.

FIGS. 5A and 5B show the construction of a head slider 51 for use in a disk drive unit according to a first embodiment of the present invention, and the head slider 51 is mounted for use on a distal end portion of the head suspension 14 of the magnetic disk drive unit 10 described in FIG. 1. In the head slider 51 of the first embodiment, only the head unit 3 of the conventional head slider 1 shown in FIG. 2 is improved to be a head unit 20. Consequently, the constructions of the portions of the head slider 51 except for the head unit 20 are identical to those of the conventional head slider 1, and therefore, with like reference numerals imparted to like portions, the constructions of those portions will be briefly described.

The head slider 51 according to the first embodiment is constituted by the slider base 2 of ferrite or the like which is described with reference to FIGS. 2A, 2B and the head unit 20 provided on the slider base 2. A first flat land portion 21 is provided on a side of the slider base 2 which flies above a disk medium at an air inflow end thereof where air flows into the slider base 2, and second and third flat land portions 22, 23 are provided at an air outflow end on the same side of the slider base 2, the heights of the second and third land portions being the same as that of the first land portion 21. First to third air bearing portions 31 to 33 are provided on top surfaces of the first to third land portions 21 to 23, respectively. The top surfaces of the first to third air bearing portions 31 to 33 are flat and are all at the same height above the slider base 2. Furthermore, pads 5 having the same height are provided at four corners of the first land portion 21 in such a manner as to protrude therefrom to reduce the static friction force.

On the other hand, the head unit 20 according to the first embodiment which is to be mounted on the slider base 2 comprises a base portion 20B which is superimposed on the slider base 2, a head portion 26 which is provided on the base portion 20B while being superimposed on the second land portion 22 and the second air bearing portion 32 at most portions thereof and a dummy head portion 27 which is provided on the base portion 20B while being superimposed on the third land portion 23 and the third air bearing portion 33 at most portions thereof. A top surface of the base portion 20B of the head unit 20 is level with the top surface of the slider base 2. Top surfaces of the head portion 26 and dummy head portion 27 are flat and are formed lower by a step than the top surfaces of the second air bearing portion 32 and the third air bearing portion 33, respectively.

Side edge portions of the flat top surfaces of the head portion 6 and the dummy head portion 7 of the head unit 3 described with reference to FIGS. 2A, 2B extend as far as positions coinciding with an air outflow side of the base portion 3B. On the other hand, air outflow-side side edge portions of the flat top surfaces of the head portion 26 and the dummy head portion 27 of the head slider 51 of the first embodiment of the present invention are located at positions which are moved towards the slider base 2 by a predetermined distance C from an air outflow side of the base portion 20B. Namely, the thickness of the head portion 26 in the air flow direction is made to be a minimum thickness in which head elements such as the GMR head and the inductive head which constitute the head 4 can be formed, and the thickness of the dummy head portion 27 is designed to be equal to the thickness of the head portion 26.

Figure 3B:
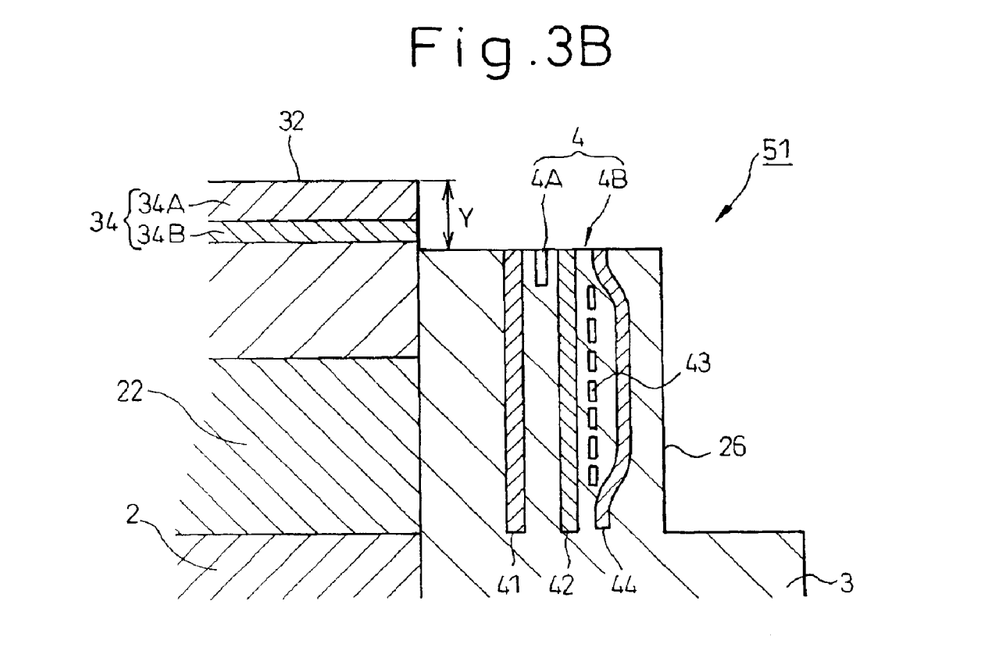
FIG. 3B is a partially enlarged view of a joint portion between a land portion of a head slider and a head portion according to the present invention.

FIG. 3B shows an enlarged sectional view of a joint portion between the head portion 26 and the second air bearing portion 32 of the head slider 51 of the first embodiment. The second air bearing portion 32 is formed on the first land portion 22 formed on the slider base 2 formed from altic ($Al_2O_3$-Tic). The second air bearing portion 32 and the first land portion (stepped surface) 22 are both formed from altic, and a protection film 34 comprising DLC (Diamond Like Carbon) 34A and Si (silicone) 34B is laminated on the surface of the second air bearing portion 32.

A difference Y in level between the head portion 26 and the second air bearing 32 is smaller than the difference X in level between the conventional head portion 6 and second air bearing 32 shown in FIG. 3A and is about 2 nm in the disk drive unit according to the first embodiment. The composite head 4 incorporated in the head portion 26 consists of a GMR head 4A and an inductive head 4B in the present embodiment. In the figure, reference numeral 41 denotes a lower shield film (a magnetic film) of the GMR head 4A, reference numeral 42 a lower magnetic film of the inductive head 4B, reference numeral 43 a coil conductor (film-like coil) and reference numeral 44 an upper magnetic film of the inductive head 4B. The composite head 4 is formed in an alumina protection film ($Al_2O_3$).

Figure 6A:
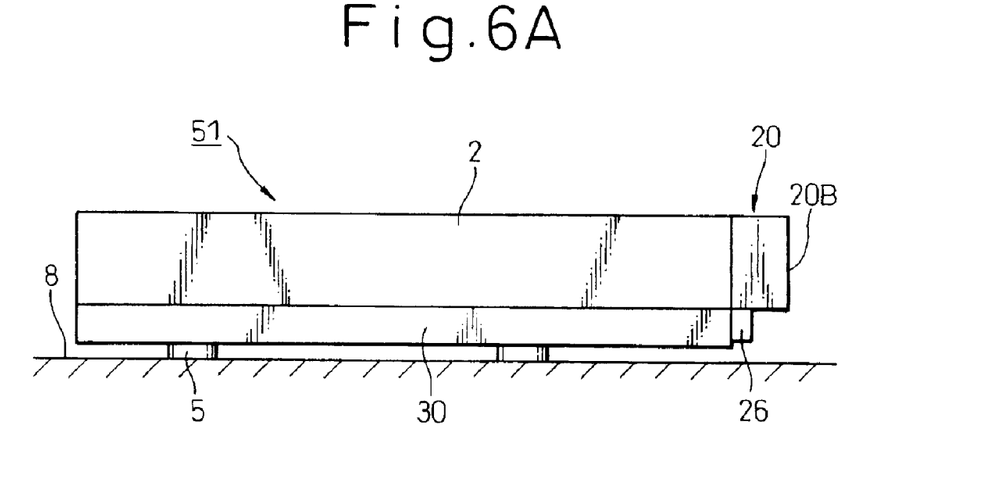
FIG. 6A is an explanatory view showing a normal posture of the head slider of the present invention which rests on a disk medium which is stopped.

FIG. 6A shows a normal posture of the head slider 51 of the first embodiment when the head slider 51 rests on the disk medium 8 which is stopped, wherein the land portions and the air bearing portions are shown schematically as an integrated body. In this state, since the head slider 51 is in contact with the disk medium 8 at the four pads 5 provided on the land portion in such a manner as to protrude therefrom, the friction force between the head slider 51 and the disk medium 8 is reduced. In addition, in the first embodiment, the distance between the head portion 26 where the head is provided and the surface of the disk medium 8 is also reduced. However, as described in FIGS. 5A, 5B, the air outflow side of the head portion 26 of the first embodiment does not extend as far as the air outflow side of the base portion 20B of the base unit 20, and the thickness of the head portion 26 is made to be a minimum thickness in which the head elements (the GMR head 4A and the inductive head 4B) can be contained, as shown in FIG. 3B.

Figure 6B:
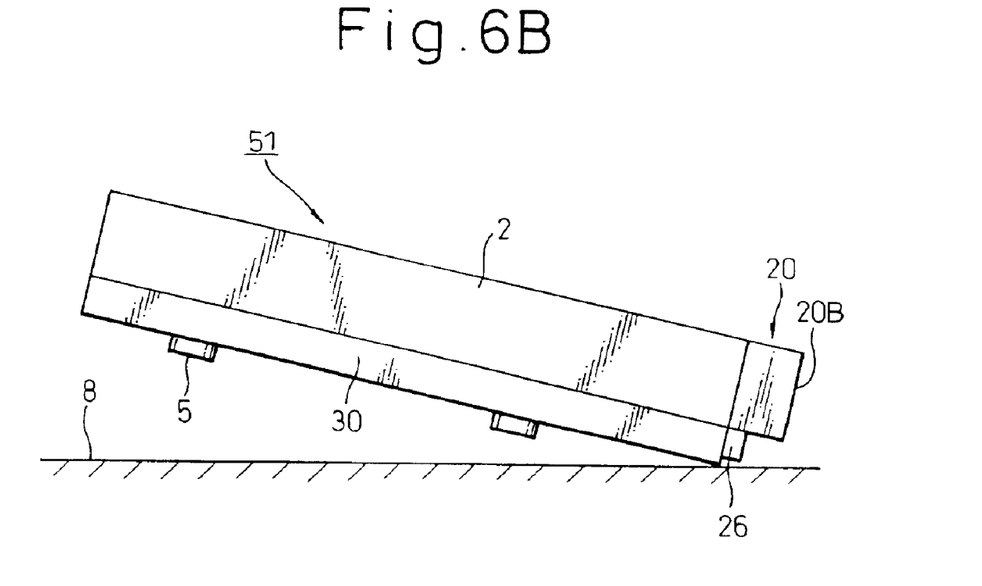
FIG. 6B is an explanatory view showing a posture of the head slider of the present invention which is at a stop when the disk medium rotates backwards.

Consequently, with the head slider 51 of the first embodiment, as shown in FIG. 6B, in the event that there occurs a reverse direction of the disk medium 8, changing the posture of the head slider 51, the top surface of the air bearing 30 of the head slider 51 comes into contact with the disk medium 8. On the other hand, since the air outflow side of the head portion 26 of the first embodiment does not extend as far as the air outflow side of the base portion 20B of the head unit 20, the air outflow side of the head portion 26 does not come into contact with the disk medium 8. Due to this, with the head slider 51 of the first embodiment, since only the top surface of the air bearing 30 comes into contact with the disk medium 8 when the disk medium 8 rotates in the reverse direction, the increase in the contact area between the head slider 51 and the disk medium 8 is suppressed to thereby prevent the increase in stiction therebetween.

Figure 7A:
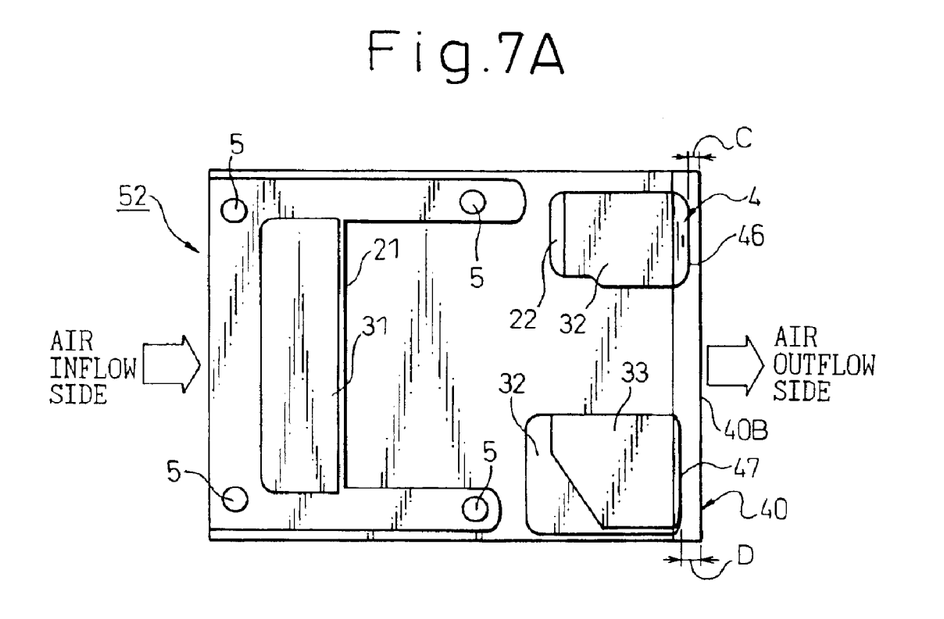
FIG. 7A is a bottom view of a head slider for use in a disk drive unit according to a second embodiment of the present invention.
Figure 7B:
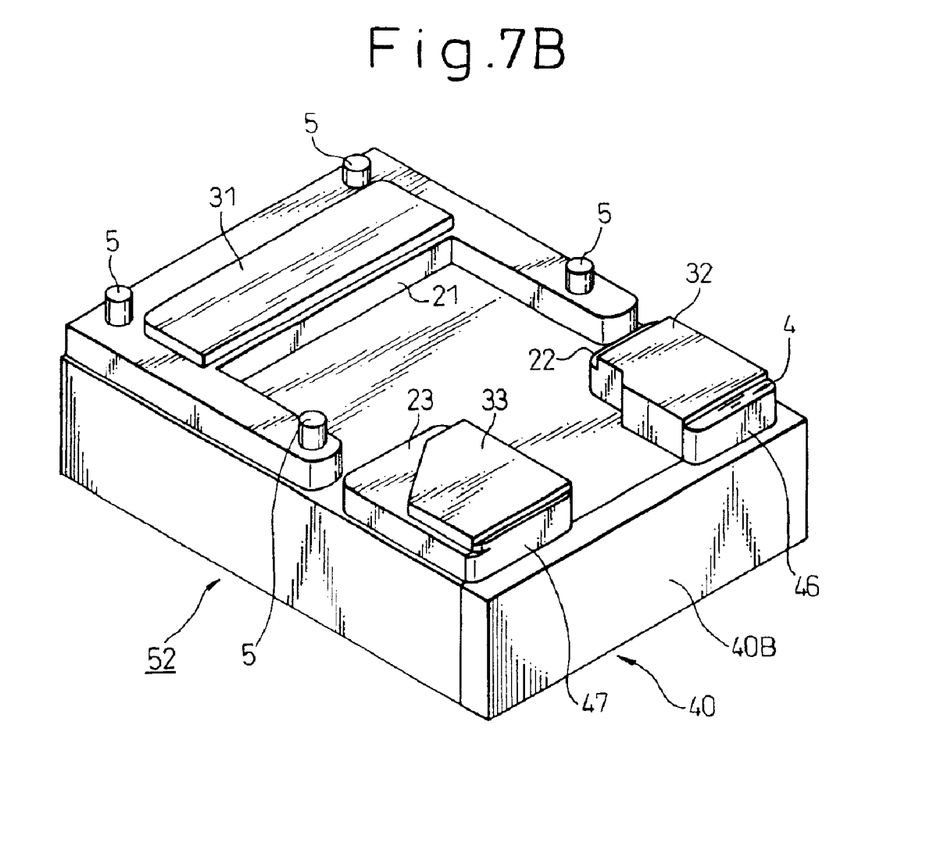
FIG. 7B is a perspective view of the head slider as viewed from a head side.

FIGS. 7A, 7B show the construction of a head slider 52 for use in a disk drive unit according to a second embodiment of the present invention. The head slider 52 of the second embodiment differs from the head slider 51 of the first embodiment shown in FIGS. 5A, 5B only in the construction of a head unit 40 which is mounted on the slider base 2. Consequently, reference numerals like those used in the first embodiment are imparted to constituent members except for the head unit 40, and the description thereof will be omitted herein.

The head unit 40 of the second embodiment, which is mounted on the slider base 2, comprises a base portion 40B which is superimposed on the slider base 2, a head portion 46 which is provided on the base portion 40B and most portions of which are superimposed on the second land portion 22 and the second air bearing portion 32, and a dummy head portion 47 most portions of which are superimposed on the third land portion 23 and the third air bearing portion 33. A top surface of the base portion 40B of the head unit 40 is level with the top surface of the slider base 2. Top surfaces of the head portion 46 and the dummy head portion 47 are flat and are, similarly to the first embodiment, formed lower by a step than the top surfaces of the second air bearing portion 32 and the third air bearing portion 33, respectively.

The side edge portions of the flat top surfaces of the head portion 26 and the dummy head portion 27 of the head slider 51 of the first embodiment are both located at positions which are moved toward the slider base 2 by the predetermined distance C from the side of the base portion 20B on the air outflow side thereof. In contrast to this, however, in the second embodiment, a side edge portion of the top surface of the head portion 46 on an air outflow side thereof is located at a position which is, similarly to the first embodiment, moved toward the slider base 2 by the predetermined distance C from a side of the base portion 40B on an air outflow side thereof. However, since the dummy head portion 47 contains no head element, the dummy head portion 47 is made as thin as possible in the air flow direction in the second embodiment, and a side edge portion of the flat top surface of the dummy head portion 47 on an air outflow side thereof is located at a position which is moved toward the slider base by a predetermined distance D (>C) from the side of the base portion 40B on the air outflow side thereof.

Consequently, the head slider 52 according to the second embodiment has the same advantage as that of the head slider 51 according to the first embodiment, and in the event that there occurs a reverse rotation of the disk medium 8, changing the posture of the head slider, the top surface of the air bearing 30 of the head slider comes into contact with the disk medium 8, but the air outflow side of the head portion 46 does not come into contact with the disk medium 8. Thus, also with the head slider 52 according to the second embodiment, since only the top surface of the air bearing 30 comes into contact with the disk medium 8 when the disk medium 8 rotates in the reverse direction, the increase in the contact area between the head slider 52 and the disk medium 8 is suppressed to thereby prevent the increase in stiction therebetween.

Figure 8A:
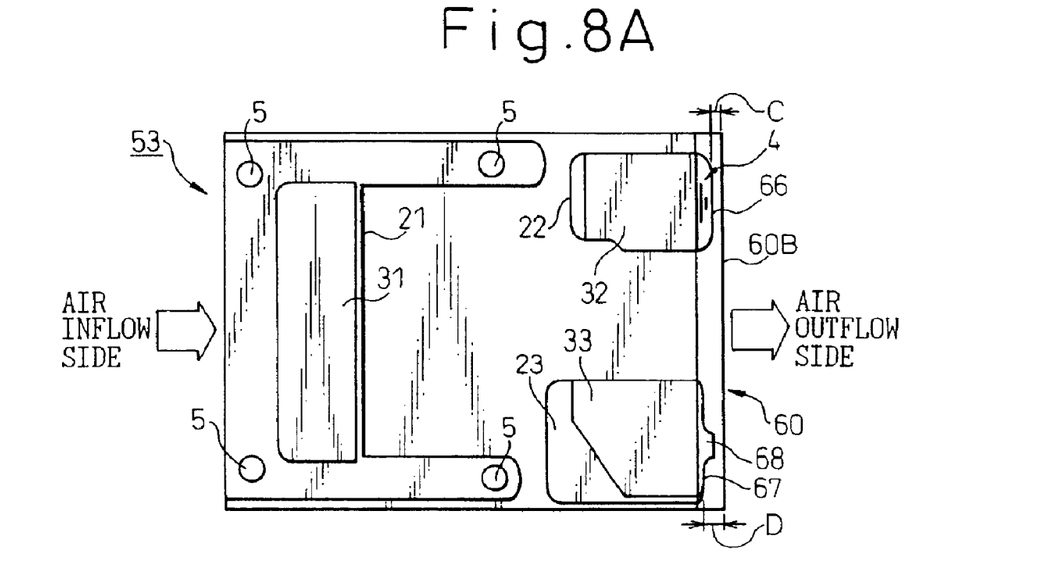
FIG. 8A is a bottom view of a head slider for use in a disk drive unit according to a third embodiment of the present invention.
Figure 8B:
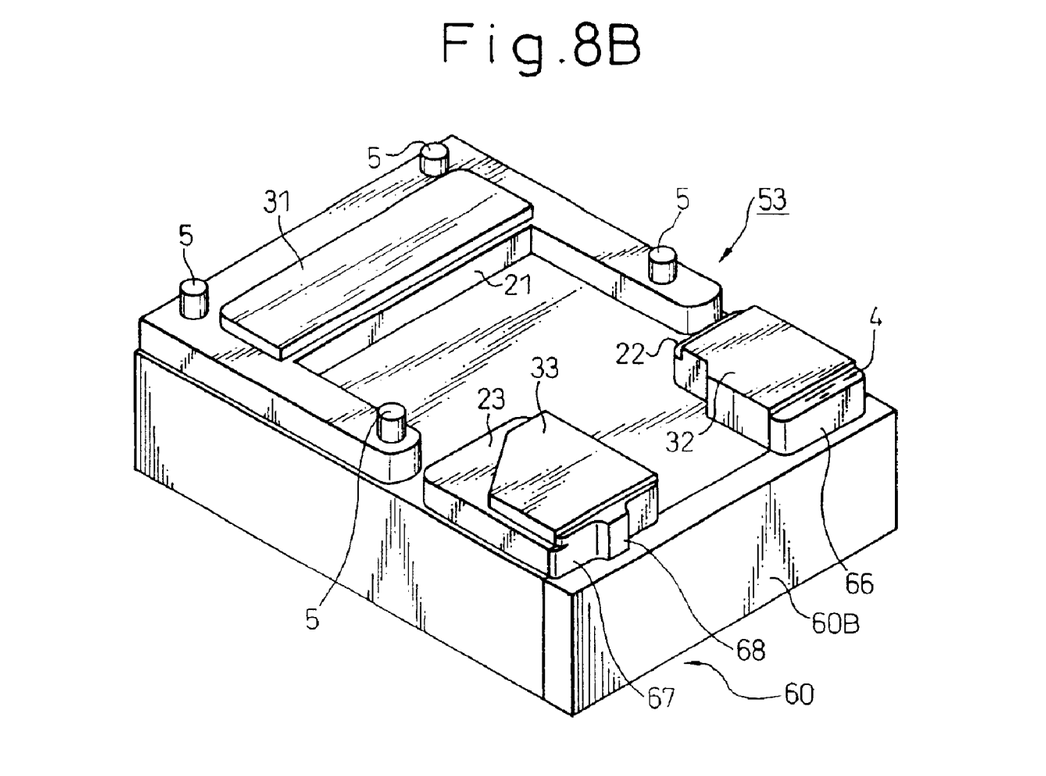
FIG. 8B is a perspective view of the head slider as viewed from a head side.

FIGS. 8A, 8B show the construction of a head slider 53 for use in a disk drive unit according to a third embodiment of the present invention. The head slider 53 of the third embodiment differs from the head slider 51 of the first embodiment only in the construction of a head unit 60 which is mounted on the slider base 2. Consequently, as reference numerals like those used in the first embodiment are imparted to like constituent members except for the head unit 60, the description of those constituent members will be omitted herein.

The head unit 60 of the third embodiment, which is mounted on the slider base 2, comprises a base portion 60B which is superimposed on the slider base 2, a head portion 66 which is provided on the base portion 60B and most portions of which are superimposed on the second land portion 22 and the second air bearing portion 32, and a dummy head portion 67 most portions of which are superimposed on the third land portion 23 and the third air bearing portion 33. A top surface of the base portion 60B of the head unit 60 is level with the top surface of the slider base 2. Top surfaces of the head portion 66 and the dummy head portion 67 are flat and are, similarly to the first embodiment, formed lower by a step than the top surfaces of the second air bearing portion 32 and the third air bearing portion 33, respectively.

The construction of the head portion 66 of the head slider 53 of the third embodiment is similar to that of the head portion 26 of the head slider 51 of the first embodiment. On the other hand, the construction of the dummy head portion 67 of the third embodiment is identical with the construction of the dummy head portion 47 of the second embodiment except that a projection 68 is provided on the dummy head portion 67 which extends therefrom in the air flow direction. Namely, since the dummy head portion 67 of the third embodiment contains no head element, the thickness thereof in the air flow direction is made to be as thin as possible, and a side edge portion of the flat top surface of the dummy head portion 67 on an air outflow side except for a portion thereof where the projection 68 is provided is located at a position which is moved toward the slider base 2 by the predetermined distance D (>C) from a side of the base portion 60B on an air outflow side thereof. In addition, in the third embodiment, an end portion of a top surface of the projection 68 is located at a position which is moved toward the slider base 2 by the predetermined distance C from the base portion 60B on the air outflow side thereof.

Thus, the provision of the projection 68 on the dummy head portion 67 increases the stability of the head slider 53 when it is inclined. In addition, even if the projection 68 comes into contact with the disk medium 8, since a contact area will be small, the resultant friction will be small.

Consequently, the head slider 53 according to the third embodiment also provides the same advantage as that provided by the head slider 51 according to the first embodiment, and even if there occurs a reverse rotation of the disk medium 8, changing the posture of the slider heat, since only the top surface of the air bearing of the head slider 53 comes into contact with the disk medium 8, the increase in the contact area between the head slider 53 and the disk medium 8 is suppressed to thereby prevent the increase in stiction therebetween.

Figure 9A:
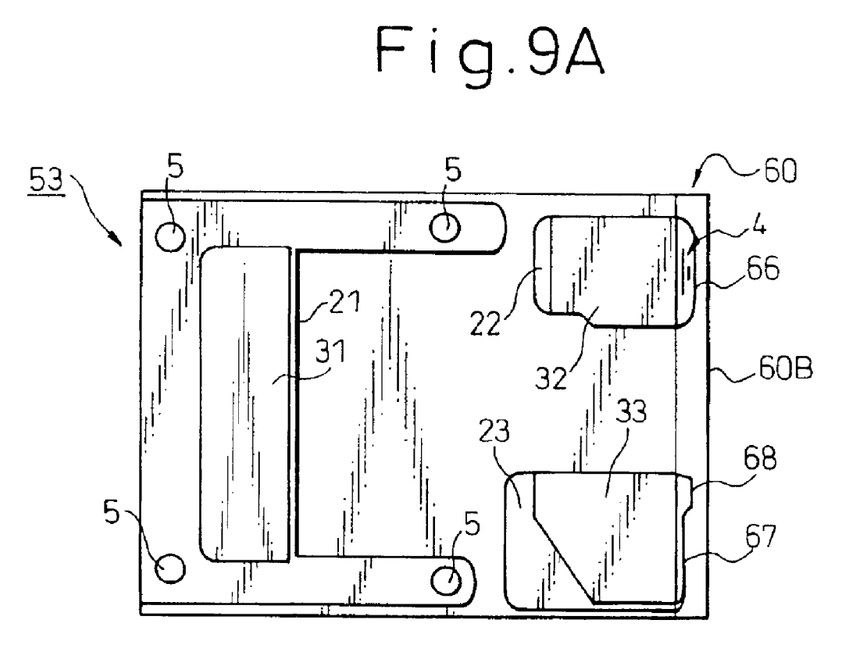
FIG. 9A is a bottom view of a head slider for use in a disk drive unit according to a modification to the third embodiment of the present invention.
Figure 9B:
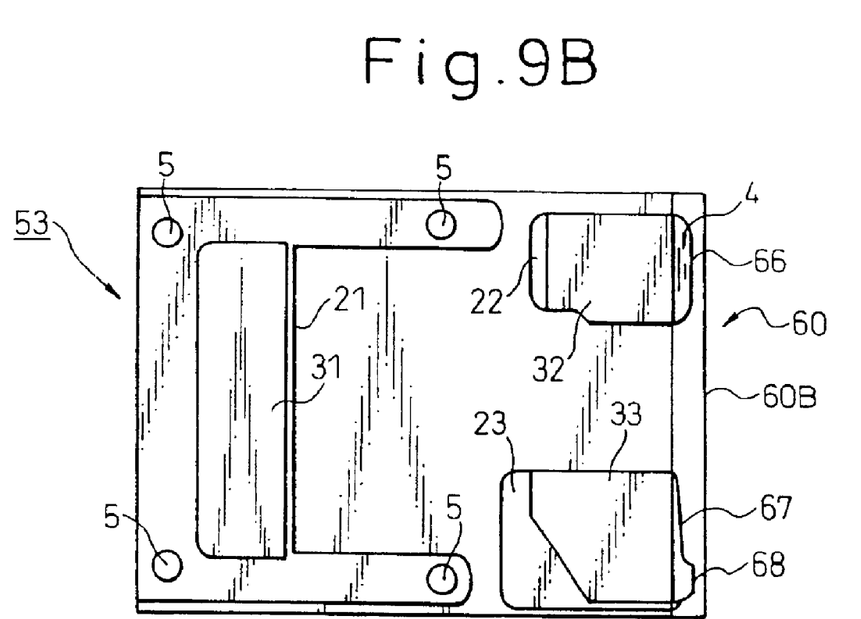
FIG. 9B is a bottom view of a head slider for use in a disk drive unit according to another modification to the third embodiment of the present invention.

FIGS. 9A, 9B show the constructions of modifications made to the head slider 53 according to the third embodiment of the present invention. The constructions of head sliders 53 shown in FIGS. 9A, 9B are identical with that of the head slider 53 of the third embodiment except for locations of the projection 68 formed on the dummy head portion 67. The head slider 53 of the modified example shown in FIG. 9A differs from the third embodiment in that the projection 68 which is provided on the air outflow side of the dummy head portion 67 is provided closer to the head portion 66. In addition, the head slider 53 of the modified example shown in FIG. 9B differs from the third embodiment in that the projection 68 which is provided on the air outflow side of the dummy head portion 67 is provided thereon closer to a location which is farthest from the head portion 66. The operations and advantages of these modified examples are identical with those of the head slider 53 according to the third embodiment.

Figure 10:
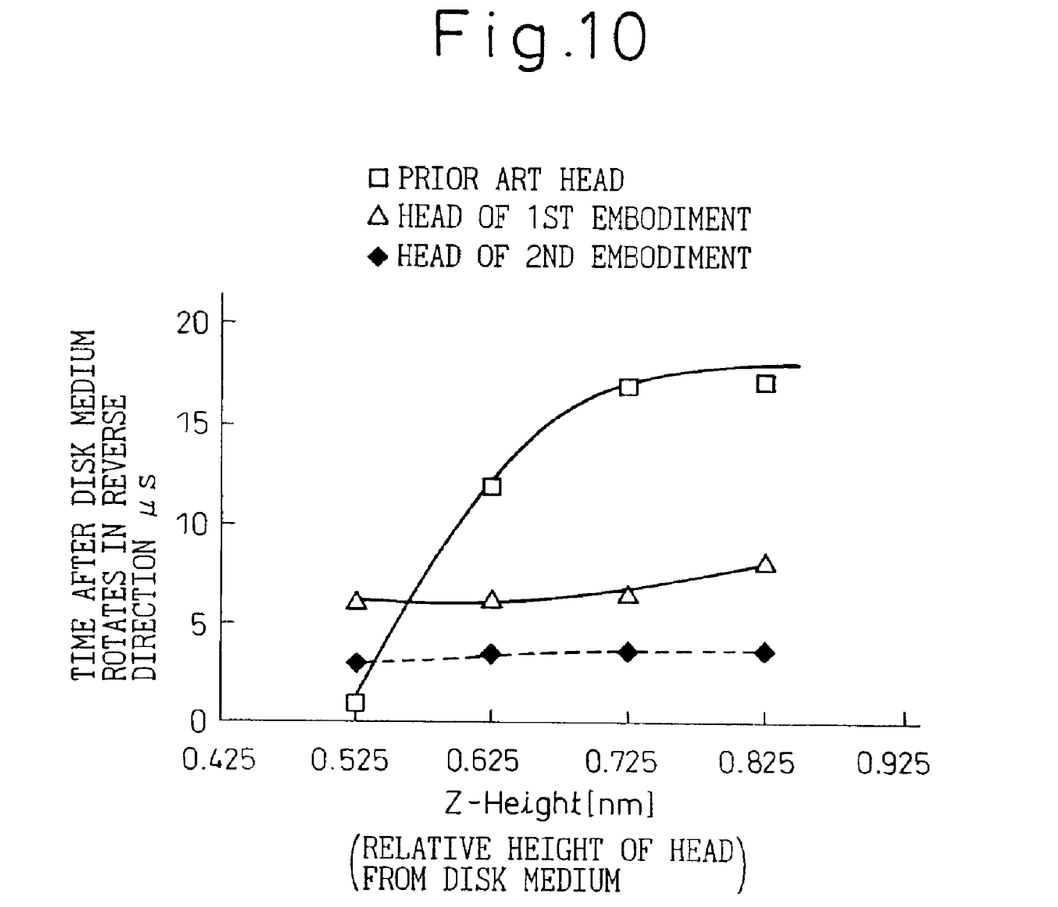
FIG. 10 is a characteristic diagram describing the effectiveness of the present invention.

FIG. 10 shows the result of a comparison of the advantages of the head slider 51 of the first embodiment and the head slider 53 of the third embodiment with that of the conventional head slider 1. Here, experiments were carried out on dummy stiction that would be produced in case the disk medium 8 rotates in the reverse direction. FIG. 10 shows the results of the measurements of friction forces produced when the disk medium rotates in the reverse direction with the mounting height of the head portion being varied. As is clear from the results, with the conventional head slider, the friction force increased as the mounting height became higher, while with the head sliders of the first and third embodiments, the friction force did not increase even if the mounting heights of the head portions became higher.

Figure 11:
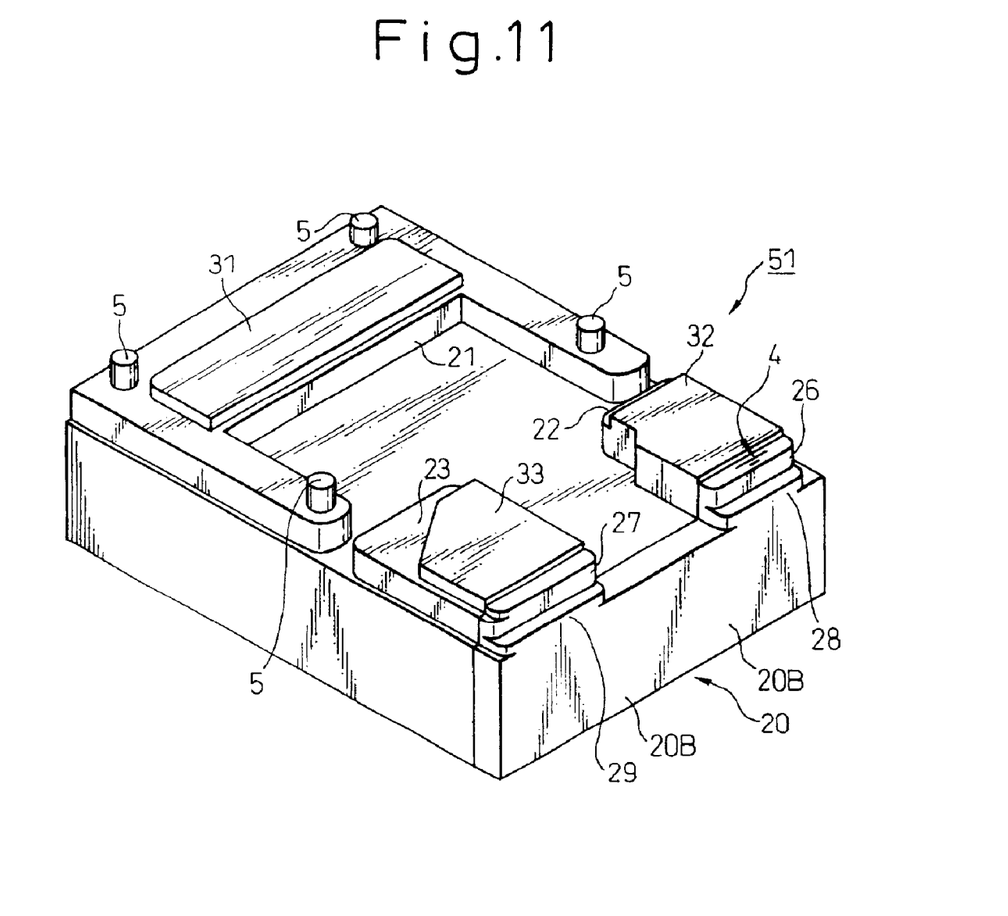
FIG. 11 is a perspective view of a head slider, as viewed from a head side, according to a modification to the head slider of the first embodiment shown in FIGS. 5A and 5B.

FIG. 11 shows another modification made to the head slider 51 of the first embodiment of the present invention described with respect to FIGS. 5A, 5B. In this modified example, stepped portions 28, 29 are provided on the air outflow sides of the head portion 26 and the dummy head portion 27 provided on the base portion 20B of the head unit 20 of the head slider 51. In this modified example, the head portion 26 and the dummy head portion 27 can be formed by deleting the alumina protection films on the head portion 6 and the dummy head portion 7 of the conventional head unit 2. Thus, even if the stepped portions 28, 29 are formed on the air outflow sides of the head portion 26 and the dummy head portion 27 provided on the base portion 20B of the first embodiment, an advantage equivalent to that provided by the slider head 51 of the first embodiment can be obtained.

Figure 12:
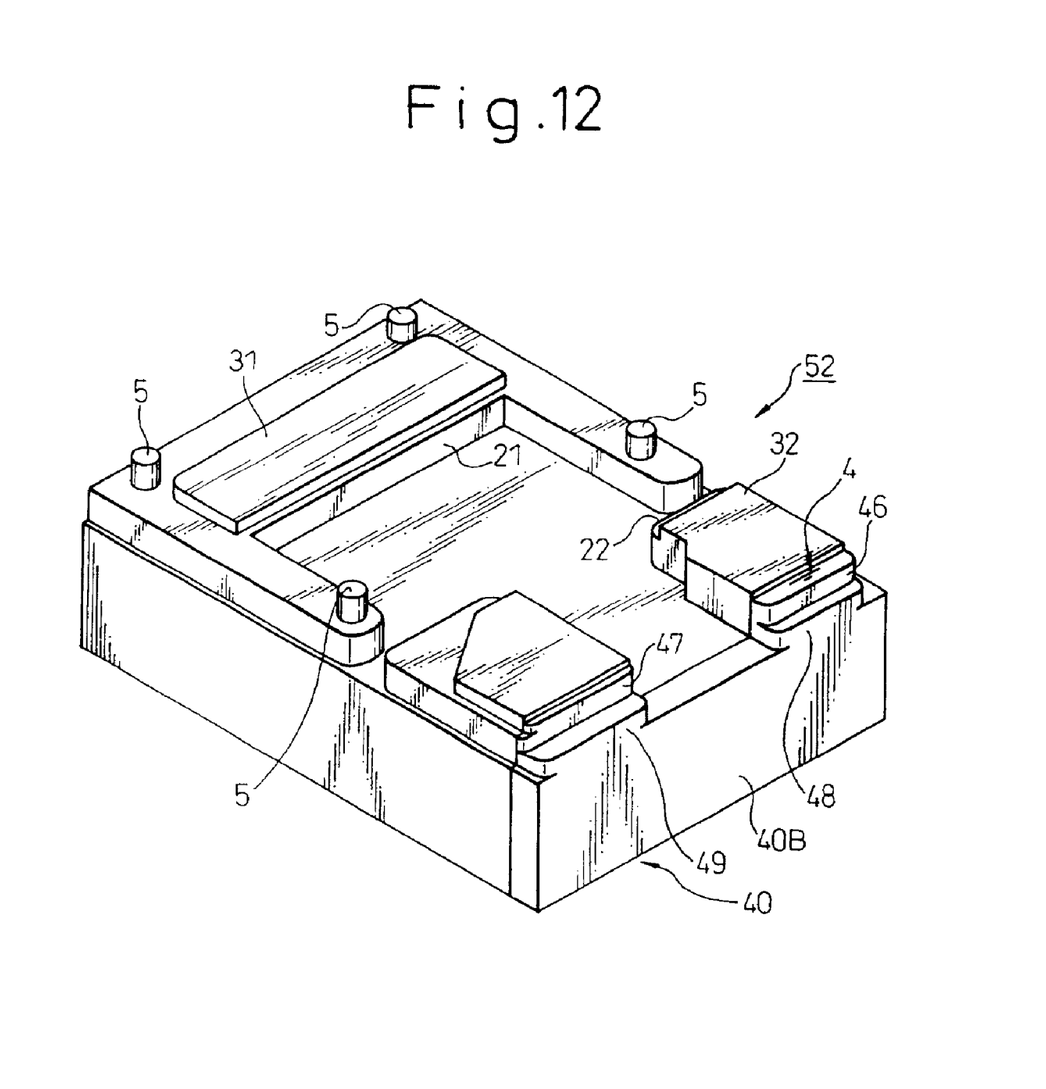
FIG. 12 is a perspective view of a head slider, as viewed from a head side, according to a modification to the head slider of the second embodiment shown in FIGS. 7A and 7B.

FIG. 12 shows a further modification made to the head slider 52 of the second embodiment of the present invention described with respect to FIGS. 7A, 7B. In this modified example, stepped portions 48, 49 are provided on the air outflow sides of the head portion 46 and the dummy head portion 47 which are provided on the base portion 40B of the head unit 40 of the head slider 52. In the modified example, the head portion 46 and the dummy head portion 47 can be formed by deleting the alumina protection films on the head portion 6 and the dummy head portion 7 of the head unit 2. Thus, even if the stepped portions 48, 49 are formed on the air outflow sides of the head portion 46 and the dummy head portion 47 which are provided on the base portion 40B of the second embodiment, an advantage equivalent to that provided by the head slider 52 of the second embodiment can be obtained.

Note that while the embodiments are described as three air bearings being provided on the slider base, the number and shape of air bearings are not limited to those described in the above embodiments.

What is claimed is:

1. A head slider for use in a disk drive unit, comprising:
    generally flat air bearing portions formed in parallel on both sides of a surface of the head slider, which flies above a disk medium, at an air outflow end thereof in such a manner that said air bearing portions are raised from a main body of the head slider;
    a head portion comprising head elements and a first protection film portion for protecting said head elements said head portion being provided adjacent to an air outflow end of one of said air bearing portions;
    a dummy head portion comprising only a second protection film portion provided adjacent to an air outflow end of another of said air bearing portions,
    top surfaces of said head portion and said dummy head portion being formed lower by a step with respect to said head slider main body than said top surfaces of said air bearing portions;
    a third protection film portion formed at said air outflow end adjacent to said first and second protection film portions, said top surfaces of said head portion and said dummy head portion being formed between said top surfaces of said air bearing portions and said third protection film portion; and
    a protection film disposed on one of said air bearing portions;
    wherein said first and second protection film portions are orthogonal to said protection film disposed on one of said air bearing portions.

2. A head slider as set forth in claim 1, wherein a distance in a longitudinal direction of said head slider of an area of said top surface of said head portion is substantially equal to a distance in said longitudinal direction of an area of said top surface of said dummy head portion.

3. A head slider as set forth in claim 1, wherein a distance in a longitudinal direction of said head slider of an area of said top surface of said dummy head portion is longer than a distance in said longitudinal direction of an area of said top surface of said head portion.

4. A head slider as set forth in claim 1, wherein said top surfaces of said head portion and said dummy head portion are level with a flying height of said surface of said head slider main body which flies above said disk medium.

5. A head slider as set forth in claim 1, wherein said top surfaces of said head portion and said dummy head portion are positioned higher than a flying height of said surface of said head slider main body which flies above said disk medium.

6. A head slider as set forth in claim 1, wherein a plurality of pads are provided on said surface of said head slider main body which flies above said disk medium for avoiding a sticking of the head slider to said disk medium when said disk medium is at a stop.

7. A magnetic disk drive unit, comprising:
    a spindle motor for rotating at least one disk medium, and
    a head slider, further comprising a head for reading data from and writing data to said at least one disk medium, said head slider being mounted via a head suspension on a distal end portion of a carriage which is driven by a voice coil motor and able to perform seeking relative to recording tracks formed on said at least one disk medium,
    wherein generally flat air bearing portions are formed in parallel on both sides of a surface of said head slider, which flies above said disk medium, at an air outflow end thereof in such a manner that said air bearing portions are raised from a main body of said head slider,
    wherein a head portion comprising head elements and a first protection film portion for protecting said head elements is provided adjacent to an air outflow end of one of said air bearing portions,
    wherein a dummy head portion comprising only a second protection film portion is provided adjacent to an air outflow end of another of said air bearing portions,
    top surfaces of said head portion and said dummy head portion being formed lower by a step with respect to said head slider main body than top surfaces of said air bearing portions,
    wherein a third protection film portion is formed at said air outflow end adjacent to said first and second protection film portions, said top surfaces of said head portion and said dummy head portion being formed between said top surfaces of said air bearing portions and said third protection film portion, and
    wherein a protection film is disposed on one of said air bearing portions;
    wherein said first and second protection film portions are orthogonal to said protection film disposed on one of said air bearing portions.

8. A head slider as set forth in claim 7, wherein a distance in a longitudinal direction of said head slider of an area of said top surface of said head portion is substantially equal to a distance in said longitudinal direction of an area of said top surface of said dummy head portion.

9. A head slider as set forth in claim 7, wherein a distance in a longitudinal direction of said head slider of an area of said top surface of said dummy head portion is longer than a distance in said longitudinal direction of an area of said top surface of said head portion.

10. A head slider as set forth in claim 7, wherein said top surfaces of said head portion and said dummy head portion are substantially level with a flying height of said surface of said head slider main body which flies above said disk medium.

11. A head slider as set forth in claim 7, wherein said top surfaces of said head portion and said dummy head portion are positioned higher than a flying height of said surface of said head slider main body which flies above said disk medium.

12. A head slider as set forth in claim 7, wherein a plurality of pads are provided on said surface of said head slider main body which flies above said disk medium for avoiding a sticking of said head slider to said disk medium when said disk medium is at a stop.

13. A head slider for use in a disk drive unit, comprising:

a slider main body having at least one air bearing portion on the head slider which flies above a disk medium at an air outflow end thereof in such a manner that said at least one air bearing portion is raised a step from said slider main body; and a head unit provided adjacent to an air outflow end of said slider main body having a head portion comprising head elements and a first protection film for protecting said head elements, and projecting from a base portion thereof, wherein a top surface of said base portion is substantially level with a top surface of said slider main body, wherein said head portion is formed adjacent to one of said air bearing portions and a top surface of said head portion is formed lower by a step with respect to said head slider main body than a top surface of said air bearing portions, and wherein a rear end surface of said head portion on said base portion projects from said one of said air bearing portions in a direction of said airflow less than a rear end surface of said base portion.

* * * * *